(12) United States Patent
Martinez-Gottschalk et al.

(10) Patent No.: US 6,543,904 B1
(45) Date of Patent: *Apr. 8, 2003

(54) DISPLAY PANEL WITH A LUMINOUS DISPLAY FIELD

(75) Inventors: José Martinez-Gottschalk, Frankfurt (DE); Winfried Möll, Laubach (DE)

(73) Assignee: Mannesmann VDO AG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/297,663
(22) PCT Filed: Oct. 17, 1997
(86) PCT No.: PCT/EP97/05750
§ 371 (c)(1), (2), (4) Date: Jul. 12, 1999
(87) PCT Pub. No.: WO98/19136
PCT Pub. Date: May 7, 1998

(30) Foreign Application Priority Data

Oct. 30, 1996 (DE) .......................................... 196 44 995

(51) Int. Cl.[7] .................................................. B60Q 1/26
(52) U.S. Cl. ........................ 362/29; 362/489; 362/800
(58) Field of Search ........................ 362/29, 489, 800, 362/85, 555, 581

(56) References Cited

U.S. PATENT DOCUMENTS

| | | | | |
|---|---|---|---|---|
| 5,057,982 A | * | 10/1991 | Hanami | 362/800 |
| 5,378,158 A | | 1/1995 | Owen | |
| 5,526,236 A | * | 6/1996 | Burnes et al. | 362/800 |
| 5,743,629 A | * | 4/1998 | Helstern et al. | 362/800 |
| 5,816,681 A | * | 10/1998 | Tedesco | 362/800 |
| 5,949,347 A | * | 9/1999 | Wu | 362/800 |
| 5,988,842 A | * | 11/1999 | Johnsen et al. | 362/85 |

FOREIGN PATENT DOCUMENTS

| | | | |
|---|---|---|---|
| DE | 9108898 | | 9/1991 |
| DE | 29520930 | | 6/1996 |
| DE | 29618395 | | 1/1997 |
| EP | 0449285 | * | 2/1991 |
| EP | 0449285 | | 10/1991 |

* cited by examiner

Primary Examiner—Y. My Quach-Lee
Assistant Examiner—Peggy A Neils
(74) Attorney, Agent, or Firm—Martin A. Farber (57) ABSTRACT

A display instrument, in particular for a vehicle, with a printed circuit board, at least one illuminable display area and at least one illuminating element which has an LED and can be fastened on the printed circuit board by a contact socket. To simplify the production of the display instrument, the contact socket has a support component for activation electronics for activating the LED.

39 Claims, 5 Drawing Sheets

DISPLAY PANEL WITH A LUMINOUS DISPLAY FIELD

FIELD AND BACKGROUND OF THE INVENTION

The invention relates to a display instrument, in particular for a vehicle, with a printed circuit board, at least one illuminable display area and at least one illuminating element, which has an LED and can be fastened on the printed circuit board by a contact socket.

Such display instruments are known and are used, for example, in motor vehicles in the form of so-called instrument clusters. These instruments are of a substantially modular construction, a central housing provided inter alia with light ducts for light guiding bearing on the rear side measuring elements and a printed circuit board and being provided with a closure cover. On the front side of the central housing, facing an observer, there is arranged an instrument panel with indicator needles and various display areas. To distinguish between them, the display areas are provided with various symbols and/or are differently colored. The latter serves at the same time for improving the signaling function of the display areas. A front frame with a cover glass forms the front termination of the instrument cluster.

On account of the modular construction of said instrument clusters, it is possible, depending on the customer's requirements, to vary within broad limits both the instrumentation itself and its technical and visual design. It is obvious here to equip numerous different vehicle models with the same basic instrument and implement in it the desired additional functions according to requirements.

On account of the very great variety of models, however, it is necessary to keep in stock a large number of different printed circuit boards, which are fitted with the respectively required electronic circuits for activating the displays. Alternatively, one printed circuit board completely fitted with all the electronic circuits which may be required can be used, said printed circuit board being installed, irrespective of the detailed instrumentation, into each also only sparingly equipped—instrument.

Both specified possibilities lead to a very high expenditure in terms of production and logistics and make the display instruments expensive to a considerable extent.

SUMMARY OF THE INVENTION

To remedy this situation, it is the object of the present invention to provide a display instrument with an illuminable display area of the specified type in such a way that its production is simplified, its ease of servicing is increased and its service life is prolonged.

The object is achieved in the case of a display instrument of the specified type by the contact socket having a support component for activation electronics for activating the LED. In addition to achieving the object specified above, an instrument according to the invention offers greater functionality as well as simplified instrument construction and consequently increased assembly dependability.

It is in this case particularly favorable and further simplifies assembly and stockkeeping if the support component is connected to the contact socket and/or the LED, forming a single component.

However, it may be of advantage—for example when using standard components—if the support component is detachably connected to the contact socket and/or the LED. The connection used is, for example, a screw, plug-in or clip connection. If, on the other hand, it is not important that the individual components can be separated again, it is possible to connect the support component to the contact socket and/or the LED undetachably, for example by adhesive bonding, soldering, welding or inseparable locking.

In a particularly advantageous and compact embodiment of a display instrument according to the invention, the support component is a wall of the contact socket. In this case, it is particularly favorable if the support component is a side or end wall of the contact socket facing away from the printed circuit board. For example, a conceivable embodiment is one in which the support component is an end wall of the contact socket and electronic components of the activation electronics are arranged around an LED fitted on or in the end wall.

Conventional display instruments often have a considerable distance between an illuminating element, arranged on a printed circuit board, and a display area which can be illuminated by this illuminating element. To be able to illuminate the display area with adequate intensity over such a large distance, here it is only possible to use miniature incandescent lamps as the light source. If, in a preferred embodiment of a display instrument according to the invention, the illuminating element has an intermediate element which can be connected on one side to the contact socket and on an opposite side to the LED, then LEDs can be used as the light source, even in display instruments described above in which the printed circuit board and display area are at a not inconsiderable distance from each other. In comparison with miniature incandescent lamps, LEDs are much more reliable, they have a longer service life and are less sensitive to vibration. In particular in a case where a display instrument according to the invention is used in a vehicle, these advantages are of great significance.

Moreover, incandescent lamps have the disadvantage that they necessitate colored printing of the display areas or the use of color filters if a colored display is desired. LEDs on the other hand can themselves illuminate in color, for example red, yellow or green.

The intermediate element is preferably connected to the contact socket and/or the LED, forming a single component. This has the effect of simplifying assembly and also reducing storage expenditure in the production process.

It may be advantageous if the intermediate element is detachably connected to the contact socket and/or the LED. Conceivable here, for example, is a plug-in connection, which may be secured by clipping, or else a screw connection. In both cases, the flexibility with which the individual components can be used is increased. However, it may also be of advantage if the intermediate element is undetachably connected to the contact socket and/or the LED. Such a connection, which can be permanently maintained and is simple to produce, may be achieved, for example, by adhesive bonding, soldering, welding or locking, the latter only allowing destructive breaking up of the individual components.

In a particularly simple way, the intermediate element may be a tube, the wall of which may additionally be perforated, for example for reasons of heat dissipation or saving material. It is even more simple if the intermediate component is in bar form. It may in this case be a single bar, for example of rectangular or round cross section, or an arrangement of a plurality of corresponding bars.

Depending on the desired material properties and production possibilities, the intermediate element may advantageously consist of metal, plastic or a composite material. In a preferred embodiment, it is flexible and thus permits a largely unrestricted setting of the illuminating direction of the LED as well as simplified installation under confined spatial conditions.

It likewise simplifies assembly and logistics if the support component is connected to the intermediate element, forming a single component.

There are numerous possibilities for the connection of the contact socket to the printed circuit board. For instance, in a preferred embodiment of the invention, the contact socket is detachably connected to the printed circuit board. This connection may be, for example, a plug-in connection or—increasing the contact dependability and durability of the connection a plug-in/turning connection, for instance with a bayonet fastener. In an automated production process, it is similarly advantageous, however, if the contact socket is undetachably connected to the printed circuit board, for example by soldering.

It is known to fasten illuminating elements, having an LED, directly on a printed circuit board without using a contact socket (generally by soldering). In a display instrument, in particular for a vehicle, with a printed circuit board, at least one illuminable display area and at least one illuminating element which has an LED and can be fastened on the printed circuit board, the object described above is achieved by the illuminating element having a support component for activation electronics for activating the LED. Such an embodiment is particularly advantageous, since it is possible to dispense entirely with a contact socket as an additional component.

It is of particular advantage if the support component is a printed circuit board. It is particularly favorable, in particular for simple assembly as well as freedom of use under as many installation conditions as possible, if the printed circuit board is flexible.

To allow the support component to be both reliably identified and also installed in the correct position during the assembly operation, it advantageously has a coding, for example mechanical, optical or electronic, such as a recess or a color marking.

The support component preferably also has a spring element, which is, for example, fitted onto the support component and, if appropriate, may be additionally adhesively bonded or soldered to the latter. The spring element may, on the one hand, mechanically secure the support component on the printed circuit board, on which the illuminating element can be fastened, and, on the other hand, contact the activation electronics and the LED electrically with the aforementioned printed circuit board.

The support component could be inserted into a printed circuit board without an additional guard device. It is of particular advantage, however, if the support component has a housing guarding against dust and mechanical damage, which is, for example, screwed or fitted onto the support component. The housing preferably has in the region of one side facing away from the LED a recess or a lug and can in this way significantly simplify the handling of the support component. Easy identifiability of the color of the LED, without having to disassemble the LED from the printed circuit board, can be advantageously achieved if the housing has a color or partial coloration corresponding to the color of the LED.

The luminosity of the LED is fully utilized particularly well if the LED, the support component or the intermediate element has a reflector attachment.

In modern vehicles, on account of the extensive use of sensors for a wide variety of tasks, the significance and number of displays serving for monitoring have increased considerably. Here, the use of a color-changing LED in a display instrument according to the invention offers wide-ranging application possibilities. For example, if the activation electronics take the form of a color control for activating the LED, with such a color-changing LED a display of various operating states of a device can take place in a single symbol area. If this is used, for example, as an airbag control lamp, it is possible for example for a color-changing LED illuminating red to signal "malfunction", whereas a yellow illumination of the same LED may mean "switched off".

If, according to another embodiment, the activation electronics take the form of a timing control for activating the LED, the latter may be used (in the case of a single-color LED) for illuminating a display area over a specific unit of time (for example eight seconds) after a specific operation (for example switching on the ignition). For example, the function of a seatbelt warning lamp would correspond to this.

Printed circuit boards are usually fitted with surface-mounted devices, which in particular simplify and speed up mass production. To allow the LED to be fitted by existing production installations and to achieve a short assembly time, the LED is therefore preferably a surface-mountable LED.

It is of particular advantage if the activation electronics have a resistor as a series resistor of the LED, in order to adapt the brightness of the LED to the light intensity of further display elements and the requirements of good perceptibility and non-glare display. The activation electronics preferably have a diode for decoupling the LED.

BRIEF DESCRIPTION OF THE DRAWINGS

The invention is explained in more detail below on the basis of exemplary embodiments represented in the attached drawings, in which.

DETAILED DESCRIPTION OF THE PREFERRED EMBODIMENTS

Figure 1:
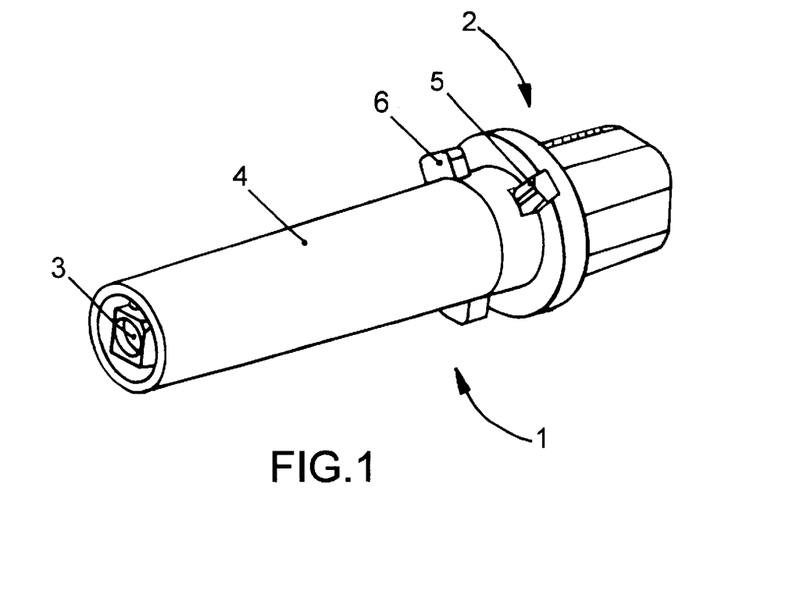
FIG. 1 shows an illuminating element according to the invention.
Figure 9A:
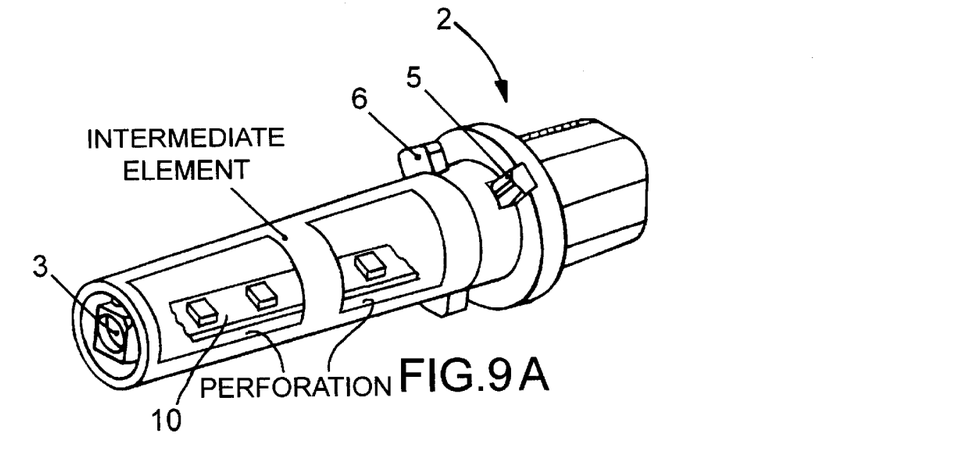
FIG. 9A shows a view of the illuminating element of FIG. 1 in accordance with an embodiment of the invention wherein a wall of an intermediate element is a perforated tube.
Figure 9B:
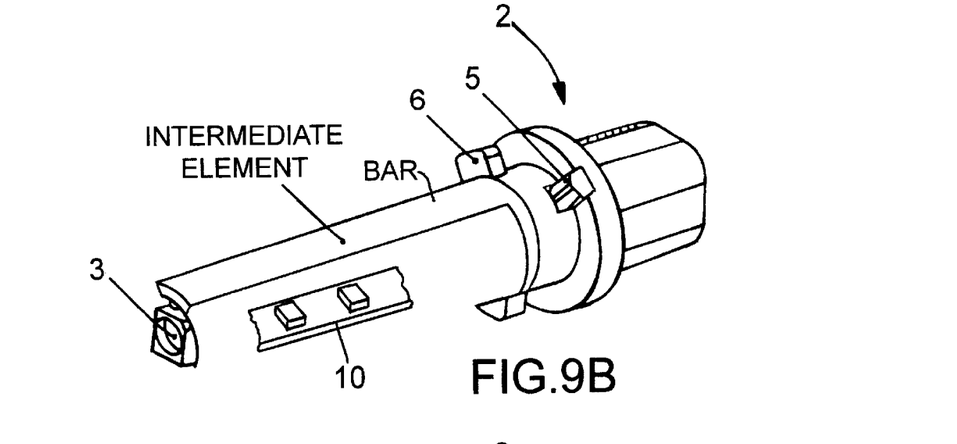
FIG. 9B shows a view of the illuminating element of FIG. 1 in accordance with an embodiment of the invention wherein an intermediate element is in bar form.
Figure 9C:
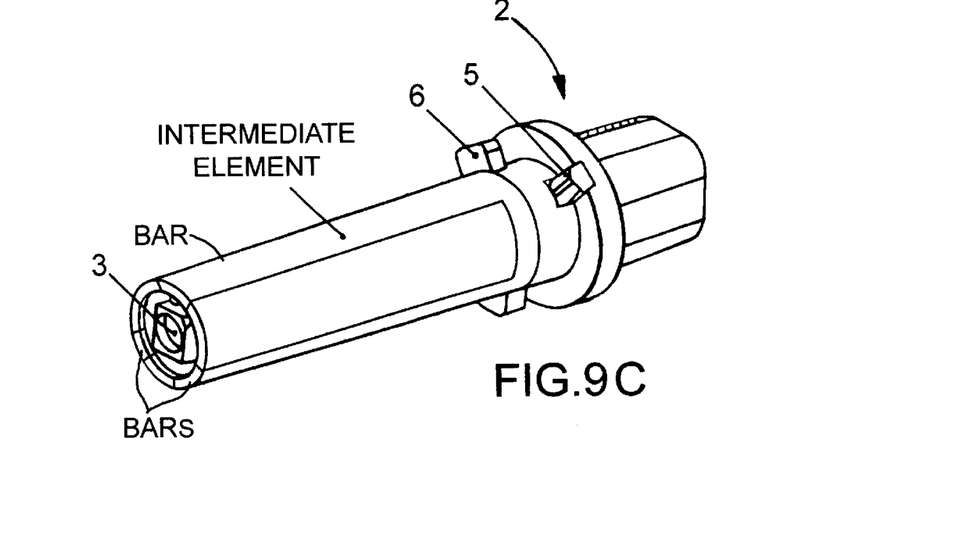
FIG. 9C shows a view of the illuminating element of FIG. 1 in accordance.with an embodiment of the invention wherein an intermediate element has one or more bars.

The illuminating element 1 represented in FIG. 1 has a contact socket 2 and an LED 3. Projections 6 serve for securely retaining the contact socket 2 on a printed circuit board (not represented here) as well as for a coding of the illuminating element 1. Connection terminals 5, only one of which is visible here, are provided for dependable connection to conductor tracks present on the printed circuit board. An intermediate element 4 contains activation electronics for activating the LED 3. Additional embodiments of the intermediate element 4 are shown as a perforated tube (FIG. 9A), as a bar (FIG. 9B), and as a plurality of bars (FIG. 9C).

Figures 2A, 2B:
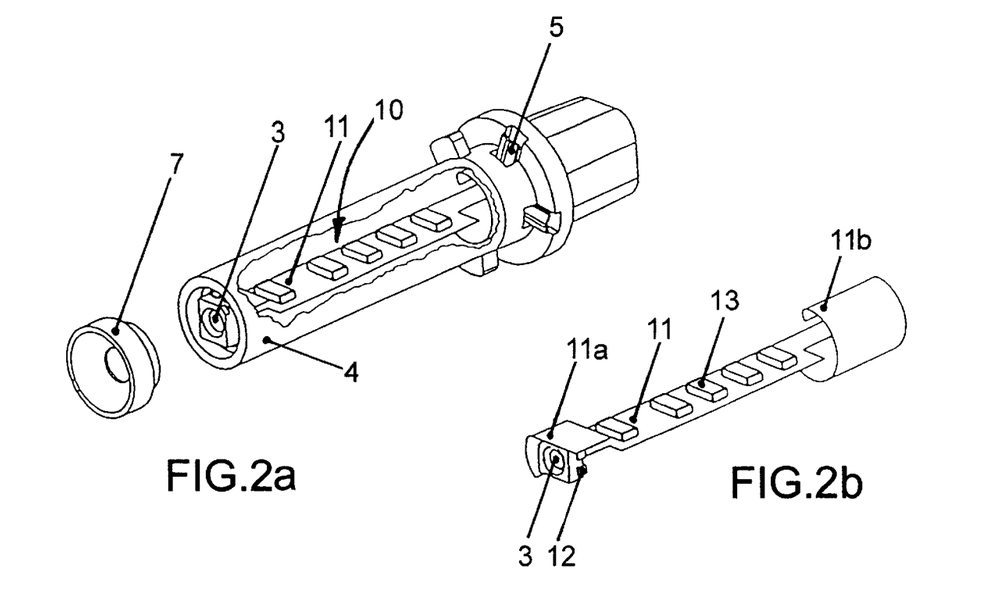
FIG. 2a shows the illuminating element according to FIG. 1 in a partially sectioned view.
FIG. 2b shows a support component for activation electronics of an illuminating element according to FIG. 1.

In the partially sectioned view of the illuminating element in FIG. 2*a*, the installation of the activation electronics 10 with the support component 11 can be clearly seen. To increase the luminous intensity of the LED 3, there is optionally provided a reflector attachment 7, which in the operating state of the illuminating element is fitted directly onto the intermediate element 4. In the representation of FIG. 2*a*, the reflector attachment is a little away from the intermediate element 4 only for the purposes of illustration. The support component 11 is represented in detail in FIG. 2*b*. It is formed from a planar, plastically deformable element by edging and bending the end regions 11*a* and 11*b*, so that optimum utilization of the installation space available is ensured. The end 11*a* of the support component 11 on the light source side holds the LED 3, electrically connected by means of connections 12. The end 11*b* of the support component 11 on the connection contact side has connections—not represented here—for connecting to the connection terminals 5. Electronic components 13, for example resistors, indicated on the surface of the support component 11, are an integral part of activation electronics, for example a color control or timing control, for activating the LED 3.

Figure 3A:
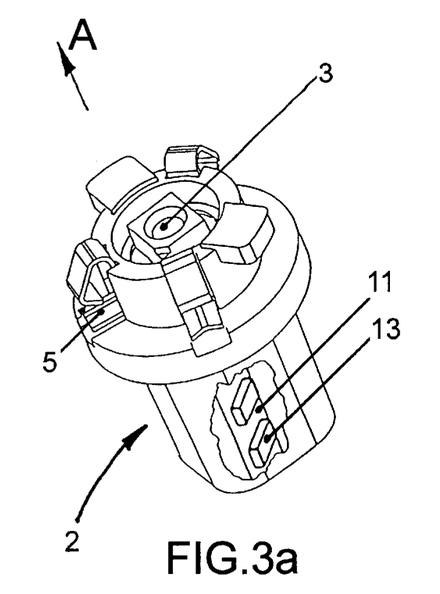
FIG. 3a shows an illuminating element according to the invention in a second embodiment in a partially sectioned view.
Figure 3B:
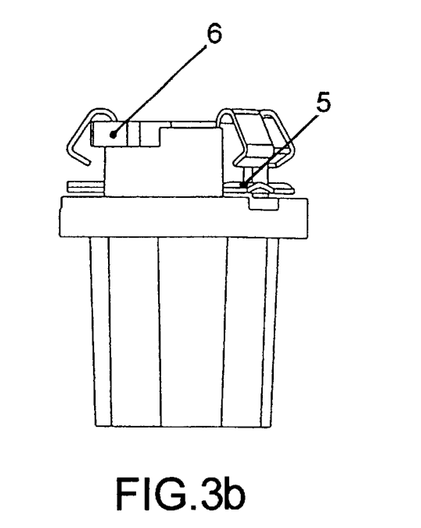
FIG. 3b shows the illuminating element according to FIG. 3a in side view.
Figure 4A:
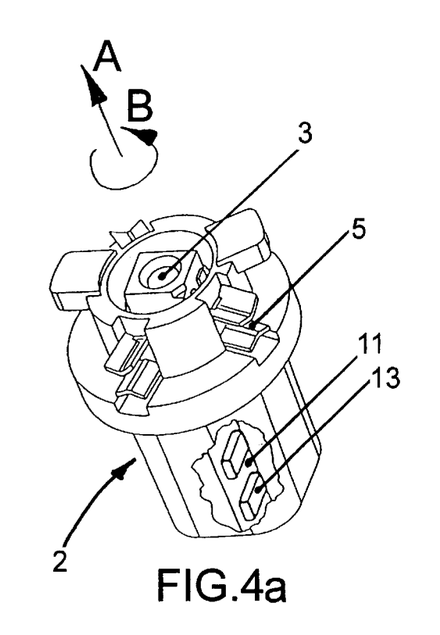
FIG. 4a shows an illuminating element according to the invention in a third embodiment in a partially sectioned view.
Figure 4B:
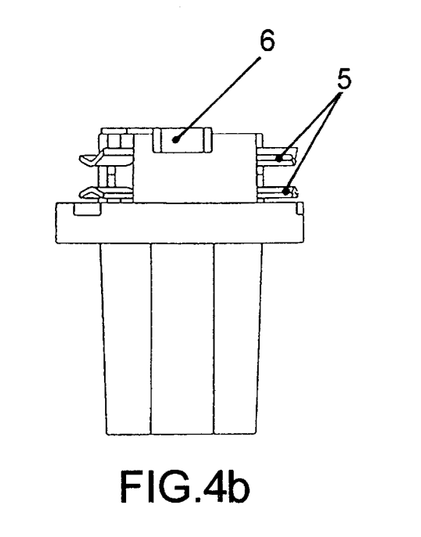
FIG. 4b shows the illuminating element according to FIG. 4a in side view.

FIGS. 3*a* and 3*b* shows in various views a particularly compact embodiment of an illuminating element, in which the support component 11 is integrated with the electronic components 13 into the contact socket 2. This contact socket 2 is a socket which can be fitted onto a printed circuit board in plugging direction A and has correspondingly shaped connection terminals 5. By contrast, a contact socket which can be fitted onto a printed circuit board (not represented) in plugging direction A and can be additionally turned in direction of rotation B is represented in FIGS. 4*a* and 4*b*. The connection terminals 5 are specially designed for this. It is also the case with this illuminating element that the support component 11 is integrated directly into the interior space of the contact socket 2. The connection terminals 5 of the illuminating elements of FIGS. 3*a*, 3*b*, 4*a*, 4*b* are suitable for using these illuminating elements with contacting on both sides in a printed circuit board.

Figure 5:
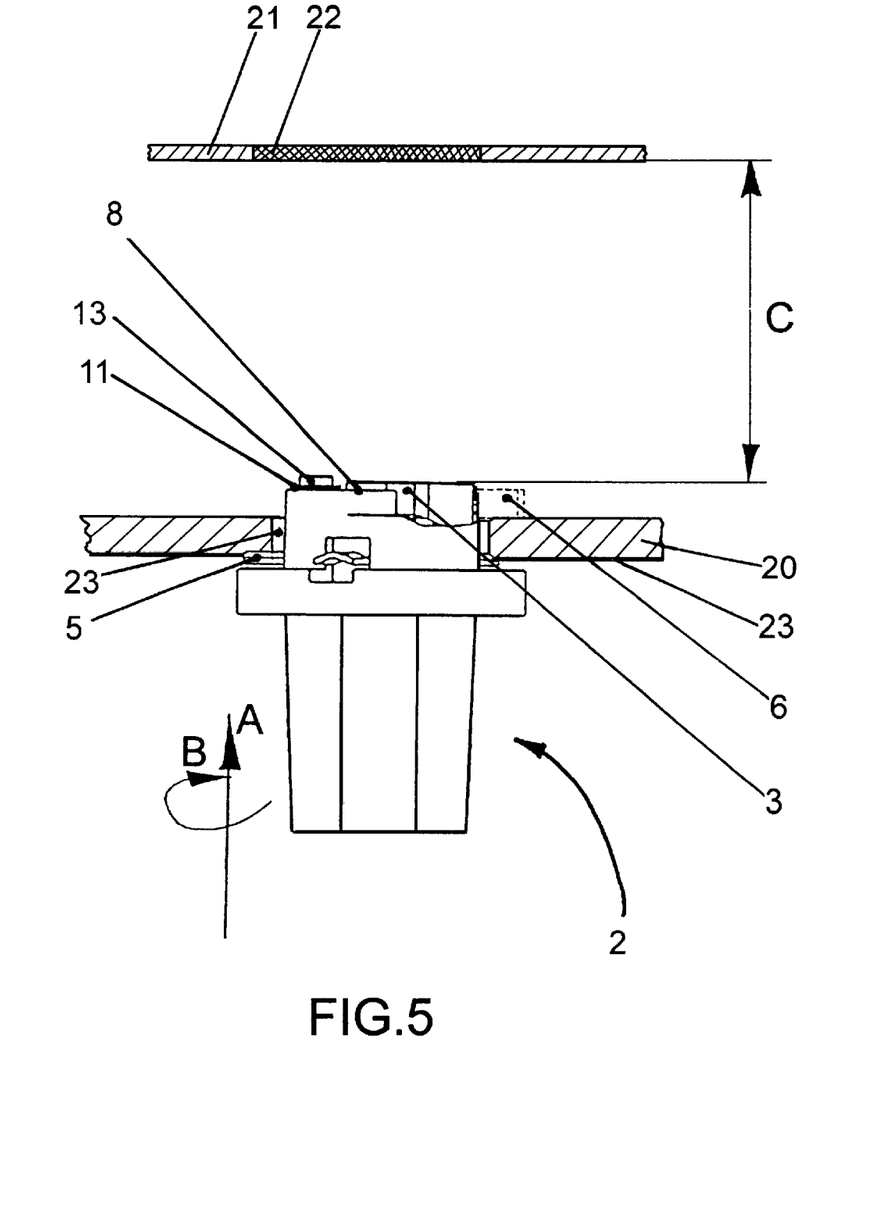
FIG. 5 shows an illuminating element according to the invention in a fourth embodiment in side view.

FIG. 5 shows a further embodiment of an illuminating element. The support component 11 with the electronic components 13 is mounted here on an end wall 8 of the contact socket 2, surrounding the LED 3. Arranged in front of the LED 3 at a distance C, which for as uniform an illumination as possible of a display area 22, which has a surface area of; for example, 10 mm×14 mm, with high luminous intensity is preferably 12 to 16 mm, in a display plane 21 is a display area 22. A printed circuit board 20, which is provided on one side with a conductor pattern 23, for example of a copper foil, receives the contact socket 2.

The display plane 21 is an instrument panel, in which the display area 22 is present as a transparent symbol area which is illuminated by the colored LED 3. Any configurations of a printed circuit board, for example rigid or flexible, as well as ceramic printed circuit boards or a lead frame, are possible as the printed circuit board 20. The same also applies to the support component 11.

Even if the printed circuit board 20 is represented in FIG. 5 with a conductor pattern 23 coated only on one side of it, the printed circuit board may also have a coating on both sides. The contact socket 2 is fitted in plugging direction A through an opening 24 into the printed circuit board 20 and secured by turning in direction of rotation B. In this way, the printed circuit board 20 is clamped between projection 6 and connection terminals 5, so that a secure and durable retention is obtained for the contact socket 2.

Figure 6A:
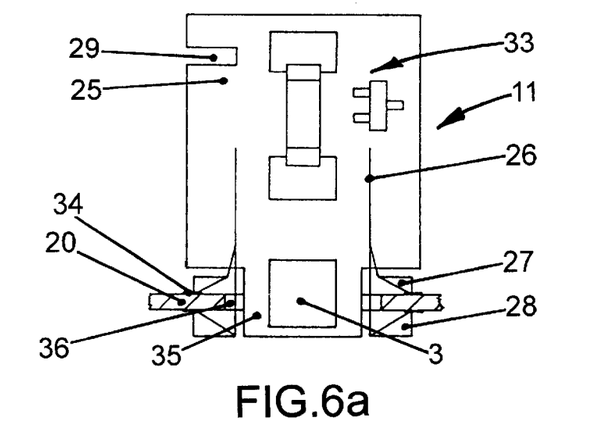
FIG. 6a shows an illuminating element according to the invention in a fifth embodiment in side view.
Figure 6B:
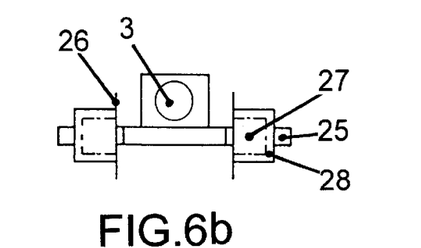
FIG. 6b shows the illuminating element according to FIG. 6a in a view from below.

A particularly simple and low-cost configuration of an illuminating element is represented in FIGS. 6*a* and 6*b*. In this case, the illuminating element has a support component 11, which is a printed circuit board 25. The printed circuit board 25 has on one narrow side a projection 35, which is provided with a side-contacted and surface-mounted LED 3 and, in the mounted state of the support component 11 in a printed circuit board 20, protrudes into a recess 36 of the printed circuit board 20. In this way, a small distance between the light source (LED 3) and a display area not represented here—is achieved. In addition, the printed circuit board 25 is fitted with activation electronics 33 for the LED 3 and is provided with a mechanical coding 29, which serves both for identification of the illuminating element (for example according to the type of activation electronics or color of the LED) and for ensuring the correct installation position of the illuminating element.

Figures 7A, 7B:
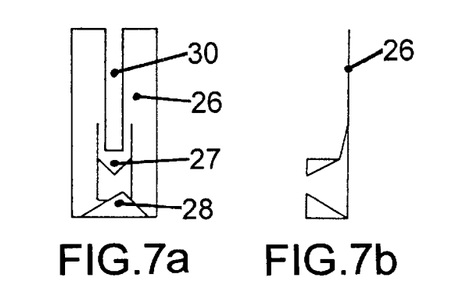
FIG. 7a shows a spring element of the illuminating element according to FIG. 6a in side view.
FIG. 7b shows the spring element according to FIG. 7a in a side view turned through 90° about its longitudinal axis.

A contacting of the printed circuit board 25 with the printed circuit board 20 is achieved by means of two spring elements 26 (FIGS. 7*a* and 7*b*). The spring elements 26, designed as contact bridges, have a longitudinal slot 30, into which the printed circuit board 25 is inserted, conducting regions of the printed circuit board 25 coming into contact with the spring elements 26. To ensure dependable contact over a relatively long time period, i.e. the service life of the display instrument, the spring elements 26 may additionally be mechanically securely connected to the printed circuit board 25, for example by soldering or adhesive bonding. At the end facing away from the printed circuit board 25, the spring elements 26 have an upper tab 27 and a lower tab 28. It is very simple if the spring element is, for example, a sheet-metal stamped/bent part, the tabs 27, 28 being bent out of the basic body of the spring element 26. The tabs 27, 28 serve for contacting with contact areas 34 of the printed circuit board 20 and, in addition, for fastening the illuminating element on the printed circuit board 20. For this purpose, the printed circuit board 20 has a recess 36, round for example, with radial recesses (not represented here) corresponding to the lower tabs 28. The illuminating element is fitted into the recess 36 and aforementioned radial recesses and is contacted and mechanically fastened by turning. An at least slight inherent elasticity of the tabs 27 and/or the tabs 28 is favorable for this.

Figure 8A:
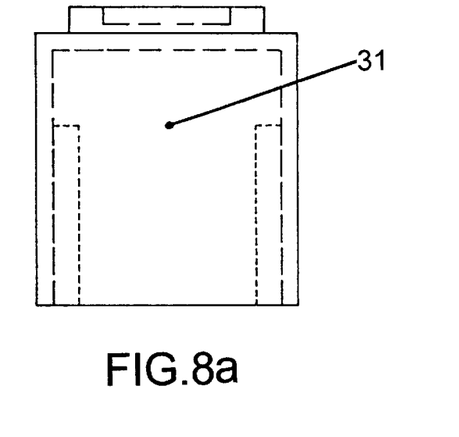
FIG. 8*a* shows a housing of the illuminating element according to FIG. 6*a* in side view.
Figure 8B:
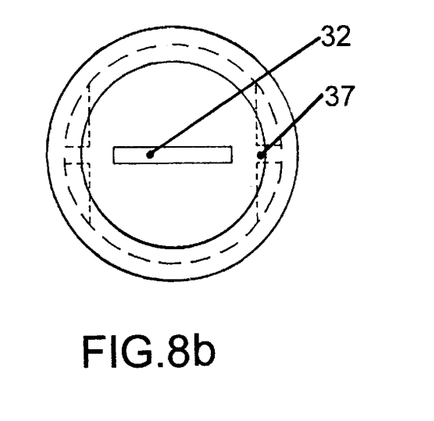
FIG. 8*b* shows the housing according to FIG. 8*a* in a view from above.

FIGS. 8a and 8b show a housing cap 31, provided for an illuminating element according to FIG. 6a. The printed circuit board 25 of the illuminating element is pushed into axial grooves 37 on the inside wall of the housing 31 and fixed, for example by means of adhesive, or are secured by the width of the grooves 37 being somewhat smaller than the thickness of the printed circuit board 25 and by the support component 11 thus being clamped between resilient flanks of the grooves 37. The lower end of the support component 11 with the LED 3 and the tabs 27, 28 in this case protrudes out of the housing, so that assembly of the illuminating element on the printed circuit board 20 continues to be possible. The housing 31 may have, for example, a color corresponding to the color of the LED 3 or a corresponding partial coloration, simplifying the handling of the illuminating element. In addition, a recess 32 for insertion of a tool is provided, in order to allow the illuminating element to be turned and consequently fixed after fitting into the printed circuit board 20.

We claim:

1. A display instrument, suitable for a vehicle, with a printed circuit board, the display instrument comprising control electronics having electronic components (13), at least one illuminable display area and at least one illuminating element, having an LED and a contact socket by which contact socket the illuminating element is fastenable on the printed circuit board and, wherein the contact socket (2) has a support component (11) for the control electronics (10) for controlling the LED (3), the LED is a color changing LED, and wherein the control electronics are held by the support component and take the form of a color control for activating the LED.

2. The display instrument as claimed in claim 1, wherein the support component (11) is connected to the contact socket (2) and/or the LED (3), forming a single component.

3. The display instrument as claimed in claim 1, wherein the support component (11) is detachably connected to the contact socket (2) and/or the LED (3).

4. The display instrument as claimed in claim 1, wherein the support component (11) is undetachably connected to the contact socket (2) and/or the LED (3).

5. The display instrument as claimed in claim 1, wherein the support component (11) is a wall of the contact socket (2).

6. The display instrument as claimed in claim 5, wherein the support component (11) is a side or end wall (8) of the contact socket (2) facing away from the printed circuit board (20).

7. The display instrument as claimed in claim 1, wherein the illuminating element (1) has an intermediate element (4) which can be connected on one side to the contact socket (2) and on an opposite side to the LED (3).

8. The display instrument as claimed in claim 7, wherein the intermediate element (4) is connected to the contact socket (2) and/or the LED (3), forming a single component.

9. The display instrument as claimed in claim 7, wherein the intermediate element (4) is detachably connected to the contact socket (2) and/or the LED (3).

10. The display instrument as claimed in claim 7, wherein the intermediate element (4) is undetachably connected to the contact socket (2) and/or the LED (3).

11. The display instrument as claimed in claim 7, wherein the intermediate element (4) is a tube.

12. The display instrument as claimed in claim 11, wherein the wall of the tube is perforated.

13. The display instrument as claimed in claim 7, wherein the intermediate element (4) is in bar form.

14. The display instrument as claimed in claim 13, wherein the intermediate element (4) has one or more bars.

15. The display instrument as claimed in claim 7, wherein the intermediate element (4) consists of metal, plastic or a composite material.

16. The display instrument as claimed in claim 7, wherein the intermediate element (4) is flexible.

17. The display instrument as claimed in claim 7, wherein the support component (11) is connected to the intermediate element (4), forming a single component.

18. The display instrument as claimed in claim 1, wherein the contact socket (2) is detachably connected to the printed circuit board (20).

19. The display instrument as claimed in claim 1, wherein the contact socket (2) is undetachably connected to the printed circuit board (20).

20. A display instrument, suitable for a vehicle, with a printed circuit board, the display instrument comprising control electronics having electronic components (13), at least one illuminable display area and at least one illuminating element, having an LED and can be fastened on the printed circuit board, wherein the illuminating element (1) has a support component (11) for the control electronics (33) for controlling the LED (3) and, wherein the control electronics are held by the support component and take the form of a timing control for activating the LED.

21. The display instrument as claimed in claim 20, wherein the support component (11) is a printed circuit board (25).

22. The display instrument as claimed in claim 21, wherein the printed circuit board (25) is flexible.

23. The display instrument as claimed in claim 20, wherein the support component (11) has a coding (29).

24. The display instrument as claimed in claim 20, wherein the support component (11) has a spring element (26).

25. The display instrument as claimed in claim 20, wherein the support component (11) has a housing (31).

26. The display instrument as claimed in claim 25, wherein the housing (31) has in the region of one side facing away from the LED (3) a recess (32) or a lug.

27. The display instrument as claimed in claim 25, wherein the housing (31) has a color or partial coloration corresponding to the color of the LED (3).

28. The display instrument as claimed in claim 1, further comprising an element intermediate the LED and the socket, wherein the LED (3), the support component (11) or the intermediate element (4) has a reflector attachment (7).

29. The display instrument as claimed in claim 20, wherein the LED (3) is a color-changing LED.

30. The display instrument as claimed in claim 29, wherein the control electronics (10; 33) are held by the support component, and take the form of a color control for activating the LED (3).

31. The display instrument as claimed in claim 20, wherein the LED (3) is a surface-mountable LED.

32. The display instrument as claimed in claim 20, wherein the control electronics (10; 33) are held by the support component, and have a resistor and/or a diode.

33. The display instrument as claimed in claim 1, wherein the LED (3) is a color-changing LED.

34. The display instrument as claimed in claim 33, wherein control electronics (10; 33) are held by the support component, and take the form of a color control for activating the LED (3).

35. The display instrument as claimed in claim 1, wherein control electronics (10; 33) are held by the support component, and take the form of a timing control for activating the LED (3).

36. The display instrument as claimed in claim 1, wherein the LED (3) is a surface-mountable LED.

37. The display instrument as claimed in claim 1, wherein the control electronics (10; 33) have a resistor and/or diode.

38. The display instrument as claimed in claim 1, wherein the support component and the control electronics extend rearwardly of the illuminating element and, upon a fastening of the display instrument to the printed circuit board, the support component extends away from the printed circuit board towards the LED and the LED is energized by both circuitry of the printed circuit board and the control electronics.

39. The display instrument as claimed in claim 20, wherein the support component and the control electronics extend rearwardly of the illuminating element and, upon a fastening of the display instrument to the printed circuit board, the support component extends away from the printed circuit board towards the LED and the LED is energized by both circuitry of the printed circuit board and the control electronics.

* * * * *